United States Patent [19]

Bossen et al.

[11] 3,825,893

[45] July 23, 1974

[54] MODULAR DISTRIBUTED ERROR DETECTION AND CORRECTION APPARATUS AND METHOD

[75] Inventors: Douglas C. Bossen, Wappingers Falls; Se J. Hong; Mu-Yue Hsiao, both of Poughkeepsie; Arvind M. Patel, Wappingers Falls, all of N.Y.

[73] Assignee: International Business Machines Corporation, Armonk, N.Y.

[22] Filed: May 29, 1973

[21] Appl. No.: 364,480

[52] U.S. Cl. .................................... 340/146.1 AL
[51] Int. Cl. .............................................. H04l 1/10
[58] Field of Search ........................... 340/146.1 AL

[56] References Cited

UNITED STATES PATENTS 3,648,239 3/1972 Carter et al. .............. 340/146.1 AL

*Primary Examiner*—Charles E. Atkinson
*Assistant Examiner*—R. Stephen Dildine, Jr.
*Attorney, Agent, or Firm*—Harold H. Sweeney, Jr.

[57] ABSTRACT

Errors in code words fetched from memory or utilized in some other device are detected by apparatus distributed throughout the memory and then corrected. Illustratively, a 72-bit parallel code word, comprising a 64-bit information portion and an 8-bit check portion is fetched from the memory. The check bit generator consists of 8 identical modular units which, in the case of use in a memory, can be located at different locations within the memory. The identical modular units are connected in accordance with connections determined by an H matrix. The H matrix is partitioned into eight equal sections associated with eight information bits forming a byte and a single check bit. The rows of each partition or section are cyclically permutated from section to section. For example, the first row of the first section becomes the second row of the second section, etc. Each partition of the H matrix contains the same number of 1's and each row within a partition is part of a different code group. Each of the identical modular arrangements contains a logic circuit grouping. The input information byte bits are connected to the circuits of the logic grouping so as to produce as circuit outputs the parities of the part of the code groups in the partition or section associated with the module. The identical modular units also contain circuitry to receive the partial code groups parities from the other modular units concerned with the same code group. These partial code group parities and the partial code group parity of the respective module are combined to provide the check bit for the particular module. The partial code group parity outputs from the module are transmitted to the successive other modules to form the partial code group parity inputs for the respective modules. After the information has been utilized such as writing in storage, the information bits and check bits are read into an error detector which compares the check bits generated from the received information bits with the received check bits. An error locator analyzes any mismatch to determine the location of an error. An error corrector then corrects any information or check bit which is identified as incorrect by the error locator. The error detector can consist of the same identical modular units as the check bit generator.

8 Claims, 7 Drawing Figures

H-MATRIX OF MODULAR (72,64) CODE

BASIC MODULE

NETWORK MODULE FOR BYTE i

INTERCONNECTION OF MODULES

MODULAR DISTRIBUTED ERROR DETECTION AND CORRECTION APPARATUS AND METHOD

BACKGROUND OF THE INVENTION

1. Field of the Invention

The invention relates to error detection and correction in data utilized in a data processing system, and more particularly, to an improved check bit generation, error detection and correction arrangement wherein the design allows modular mechanization of the encoder and error detector into identical units having the minimum number of input/output connections.

2. Description of the Prior Art

In the prior art, given the need to store or transfer information bits (for example, D0, D1 and D2) between two points, there have been proposed many techniques for detecting and correcting errors in the data bits. These techniques are explained in any of a number of textbooks in the field, for example: *Error Detecting Logic for Digital Computers* by Frederick F. Sellers, Jr., Mu-Yue Hsiao and Leroy W. Bearnson (McGraw Hill 1968); and *Error Correcting Codes* by W. Wesley Peterson (The M.I.T. Press 1961). Typically, check bits are carried along with the information bits for indicating the occurrence, and location, of errors in both the information bits and the check bits. In the well known Hamming Code, (see, for example, Reissue U.S. Pat. No. 23,601, "Error-Detecting and Correcting System," Richard W. Hamming et al., assigned to Bell Telephone Laboratories) each check bit and preselected information bits form a code group, the value of each check bit being determined by the value of the information bits in its code group. Therefore, any change in either an information bit or a check bit during transmission will be identifiable at the receiving end. Table 1 illustrates a simplified 6-bit single error correcting and single error detecting (SEC/SED) code wherein three check bits C1, C2 and C3 are assigned values as a function of three information bits D0, D1 and D2.

TABLE 1 — Prior Art

| Hamming SEC/SED (6,3) Code | | | | | | |
|---|---|---|---|---|---|---|
| | *k* information bits | | | (*n*–*k*) check bits | | |
| | D0 | D1 | D2 | C1 | C2 | C3 |
| S1 | | | | 1 | 0 | 0 |
| S2 | | | | 0 | 1 | 0 |
| S3 | | | | 0 | 0 | 1 |

The total number of bits in the code word are *n*, there are *k* information bits, *n*–*k* (also called *r*) check bits and the code is specified as (*n*,*k*). Referring to Table 2, check bits C1, C2, C3 and information bits D0, D1 and D2 form code group S1.

TABLE 2 — Prior Art

| Hamming SEC/SED (6,3) Code | | | | | | |
|---|---|---|---|---|---|---|
| | D0 | D1 | D2 | C1 | C2 | C3 |
| S1 | 1 | 0 | 1 | 1 | 0 | 0 |
| S2 | 1 | 1 | 1 | 0 | 1 | 0 |
| S3 | 0 | 1 | 1 | 0 | 0 | 1 |

The relationships of the check bits and information bits represented by the matrix are subject to the rules that each code group must contain at least one check bit, each information bit must be a member of at least one code group and each code group must contain unique sets of information bits and check bits. The relationships dictate EXCLUSIVE OR functions, each information bit "one" in the matrix representing an input and each check bit "one" representing an output. For example, assuming even parity, check bit C1 is one if there is a one in either position D0 or D2, and is zero if there is a one in both or neither positions. Odd parity would give opposite values to C1. Stated another way, check bit C1 is equal to the EXCLUSIVE OR of DO and D2 for even parity. Similarly, check bit C2 is equal to the EXCLUSIVE OR of D0, D1 and D2. Typically, each code group contains more than one check bit.

If a single error occurs in the transmission of information contained in the code word comprising bits D0, D1, D2, C1, C2 and C3, the error will be reflected as a variance between the expected parity of each code group and the parity of the code group received. This variance results from an error which can be located in the received word in accordance with an analysis of the information received, as shown with reference to Table 3.

TABLE 3 — Prior Art

| | D0 | D1 | D2 | C1 | C2 | C3 | Syndrome |
|---|---|---|---|---|---|---|---|
| S1 | 1 | 0 | 1 | 1 | 0 | 0 | 1 |
| S2 | 1 | 1 | 1 | 0 | 1 | 0 | 1 |
| S3 | 0 | 1 | 1 | 0 | 0 | 1 | 0 |

The analysis is made by examining each code group for accuracy (even parity) and then deriving the erroneous bit location. The examination of a code group indicates a "syndrome," a one indicating that the code group's parity is incorrect. For example, a fault effecting information bit D0 causes an S1, S2 and $\overline{S3}$ syndrome (parity errors in code groups S1 and S2). Since information bit D0 is the only bit effecting code groups S1 and S2 and not S3, it is the incorrect bit.

While the foregoing has assume single error correction and single error detection, double error detection is desirable. In the prior art this can be achieved by the addition of an additional check bit CT which examines the overall parity of all bits in the code word, as shown in Table 4.

TABLE 4 — Prior Art

| Hamming SEC/DED (7,3) Code | | | | | | | |
|---|---|---|---|---|---|---|---|
| | D0 | D1 | D2 | C1 | C2 | C3 | CT |
| S1 | 1 | 0 | 1 | 1 | 0 | 0 | 0 |
| S2 | 1 | 1 | 1 | 0 | 1 | 1 | 0 |
| S3 | 0 | 1 | 1 | 0 | 0 | 1 | 0 |
| ST | 1 | 1 | 1 | 1 | 1 | 1 | 1 |

Without the extra CT bit, any two errors in a code group (for instance, an error in bits D0 and C1) would leave even parity in that code group, but not necessarily in others, and thus indicate the error location incorrectly. The additional CT bit indentifies this (uncorrectable) condition by indicating that the overall parity has not changed even though one or more code groups do detect a change.

In constructing check bit generating circuits, each information bit "one" in the information bit matrix represents one input leg of an EXCLUSIVE OR circuit and each check bit "one" represents an output. In the case of error detecting circuits, each "one" represents a leg of an EXCLUSIVE OR circuit, and the error locating circuit requires still additional circuits. Even assuming the availability of EXCLUSIVE OR circuits with more than two inputs, it can be seen that a large number of circuits must be provided and, further, that some signals inefficiently travel substantially longer paths than others, the speed of operation being determined by the longest path. The overall check bit CT is a major complicating factor because it contains only "ones" requiring many inputs and a long signal path.

U.S. Pat. No. 3,623,155, filed Dec. 24, 1969, and issued Nov. 23, 1971 entitled "Optimum Apparatus and Method for Check Bit Generation and Error Detection, Location and Correction" discloses an improved circuit, illustrated by a matrix of the type shown in Table 5. A fourth uniquely positioned check bit C4 is provided for monitoring an arbitrary number of information bits, (shown, for example, to be D0 and D1 in code group S4) which is chosen to place each information and check bit in an odd number (1, 3, 5, 7, etc.) of code groups.

TABLE 5

| DED (7,3) Code | D0 | D1 | D2 | C1 | C2 | C3 | C4 |
|---|---|---|---|---|---|---|---|
| S1 | 1 | 0 | 1 | 1 | 0 | 0 | 0 |
| S2 | 1 | 1 | 1 | 0 | 1 | 0 | 0 |
| S3 | 0 | 1 | 1 | 0 | 0 | 1 | 0 |
| S4 | 1 | 1 | 0 | 0 | 0 | 0 | 1 |

By monitoring all four code groups S1 through S4 for even parity, the resulting syndrome (containing one or more odd parities) indicates one or more errors. Since each information and check bit is assigned to an odd number of code groups, a single (or other odd) error is indicated by an odd number of code group parity indications and a double (or other even) error by an even number. Further, single errors can be easily located by decoding syndromes in accordance with their common bit assignments. For example, since an error in bit position D0 causes an S1, S2, $\overline{S3}$, S4 syndrome (even parities detected by code groups S1, S2 and S4), one AND circuit can be activated by signals indicating even parities for code groups S1, S2 and S4 (and, if desired, an odd parity for S3) to identify bit D0 as the bit needing correction.

SUMMARY OF THE INVENTION

The present invention efficiently achieves the advantages of the prior art through a design which allows a modular construction of the encoder and error detector into identical units having the minimum number of input/output connections, the minimum delay for encoding and decoding and which has an automatic module parity processor. The modular construction of the check bit generator and error detector is made possible by a coding design represented by a matrix wherein the information bits are encoded by assigning each information bit to a number of code groups and dividing the code groups into equal length sections. The partial code groups within the same section are associated with a respective information byte.

Referring to FIG. 2 showing a representative H matrix for the modular code, it can be seen that each section contains an equal number of 1 bits and that each section is a cyclic permutation of the previous section. That is, each row in the matrix forms the next row in the next matrix. The identical modular units correspond in number to the number of the equal length sections or bytes into which the code is divided. Each modular unit contains an identical logic circuit grouping for combining the bits of the byte associated with the modular unit. Each logic grouping circuit produces the parity of the partial code groups within the section. Further logic circuits are located on each module for combining the parities of the parts of the code group from the other modules, which when combined with the parity of the part of the code group of the respective module, produces the check bit for the entire code group. Similarly, the syndrome bit for the respective code group is obtained by including the check bit in the linear combination of the parities of the parts of the code group forming the overall code group.

The H matrix is designed to not only give a modular type implementation but to provide a mechanization having a minimum delay for encoding and decoding. It is also designed to give the minimum number of input/output pins per module. This is accomplished by the assignment of each bit to a number of code groups which is a minimum and which provides the maximum number of all 0 rows in each section of the matrix. The connection or assignment of 1's in the columns of the matrix are made by a method of generating vectors $(r,w)$ where $r$ is the column or vector length and $w$ is the smallest weight (number of 1's in the vector) and from the gap length vectors (gap lengths are defined as the number of 0's existing between the 1's in the vector) determining the vectors or connections which give the maximum number of code groups having all 0's. It will be seen that the maximum number of 0 rows in the matrix minimizes the number of input/output pins necessary per module.

The foregoing and other objects, features and advantages of the invention will be apparent from the following more particular description of the invention as illustrated in the accompanying drawings.

DESCRIPTION OF THE PREFERRED EMBODIMENT

GENERAL DESCRIPTION

Figure 1:
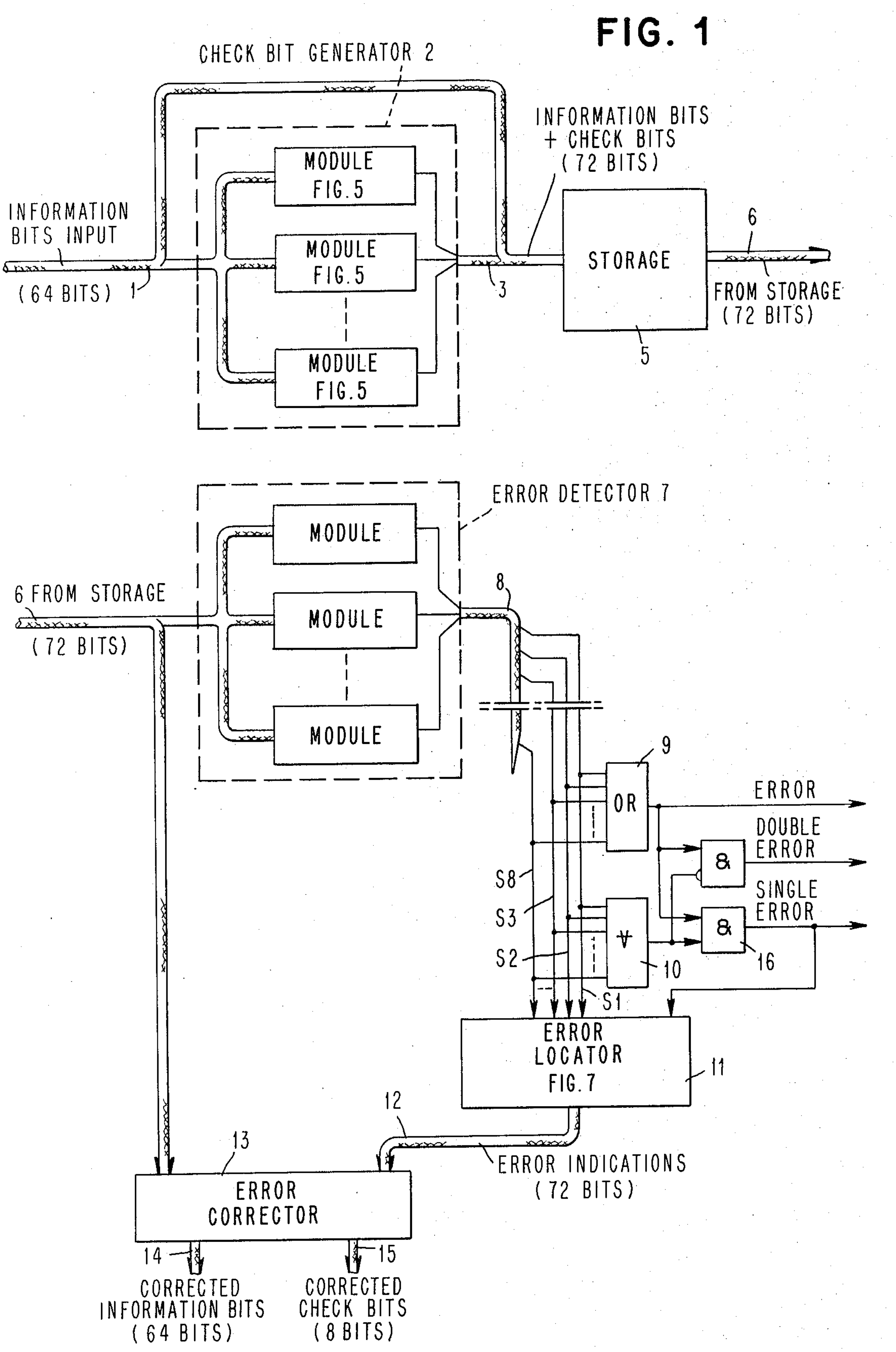
FIG. 1 is a block diagram showing a system embodying the invention.

Referring to FIG. 1, 64 information bits D0–D63 present on the input bus 1 are made available to a check bit generator. The 64 information bits are divided into bytes B1–B8 of 8 bits each. The check bit generator generates, on output bus 3, a check bit for each information byte which is added onto the respective check byte before being utilized or placed in storage 5. These stored information bytes and check bits are read from the storage on bus 6 and applied to the error detector 7 to the generate the 8 bit syndrome S1–S8 on bus 8 representative of eight code groups. The 8 syndrome bits are used to detect the presence of a single or a double error and to locate the position of a single error.

One or more signals on the eight syndrome lines cause OR-circuit 9 to place a signal on the error line. An odd number of signals on the eight syndrome lines, indicating a single (or odd) number of errors, is detected by an EXCLUSIVE OR circuit 10 which is gated to the single error line via AND circuit 16 when OR circuit 9 indicates that an error has occurred. If upon operation of the OR circuit 9 an even number of signals is present on the syndrome lines, AND circuit 16 is activated by the inhibit (inverted) input from the EXCLUSIVE OR circuit 10 to place a signal on the double error output line. The syndrome signal lines S1–S8 are also made available to an error locator 11 which supplies error indications D0′–D63′ and C1′–C8′ on 72 error indication lines 12 to an error corrector 13. The error corrector 13 combines corresponding error indications and code word positions to supply corrected information bits on bus 14 and corrected check bits on bus 15.

The general construction of the system of FIG. 1 will be explained further with reference to the matrix of FIG. 2 which symbolically represents the check bit generator 2, the error detector 7 and the error locator 11. The matrix columns show the 72 bit code word divided into 64 information bits D0–D63, identified as 0–63, and 8 check bits C1–C8 where a check bit is located at the end of every 8 bits completing a byte of information.

Each one of the check bits C1–C8 are located in a different section of the matrix. It should be noted that each byte defines a particular section of the H matrix and that each section contains the same number of 1's. Each succeeding section of the H matrix is a cyclic permutation of the prior section. For example, row 1 in the first section becomes row 2 in the second section and row 3 in the third section, etc. Each one of the check bits C1–C8 belongs to a different one of 8 code groups S1–S8 indicated in the matrix as rows S1–S8. Each 1 bit in the matrix represents a physical circuit connection. In the check bit generator 2, each one of the check bits C1–C8 is equal to the EXCLUSIVE OR function of all the information bits participating in that code group as indicated by 1's in that code group. For example, check bit C1 is equal to the EXCLUSIVE OR of information bits D0–D7, D30, D35, D36, D37, etc. Similarly, check bit C2 is formed by EXCLUSIVE ORing all information bits participating in the code group S2, namely D0, D2, D5, etc. In the error detector 7, a similar EXCLUSIVE OR operation is performed on each code group, however, including the associated check bit to obtain the respective syndrome S1–S8. For example, for code group S1, an EXCLUSIVE OR operation is performed on information bits D0–D7, D30, etc. and check bit C1. Since the check bit generator 2 generates check bits C1–C8 from an even number of 1's in each code group, (even parity) the error detector 5 recognizes, if there is no error, that the even parity has remained unchanged. However, if there is an error, one or more of the eight code groups will have odd parity causing syndrome signals on corresponding ones of S1–S8 in FIG. 1. It will be appreciated that the check bits can be generated from an odd number of 1's in each code group so that the process is operable with odd parity rather than even. The interpretation of these syndromes by the error locator 11 is also represented by the matrix of FIG. 2. An error in an information bit or a check bit position (matrix columns) effects predetermined code groups (matrix rows S1–S8). For example, an error in information D0 will cause code groups S1, S2 and S3 to have odd parity which is reflected by 1 bit syndrome signals from the error detector 5 on lines S1, S2 and S3. Error location is accomplished if one AND circuit is provided for each code word bit (matrix column) with inputs from each syndrome line for the code group to which it belongs, (one bit in its matrix column). This is illustrated in FIG. 2 by the numbers underneath the matrix. For example, since syndrome S1, S2 and S3 is caused by an error in bit D0, the output of an AND circuit is caused by a coincidence of inputs S1, S2 and S3 and "single error." The additional inputs $\overline{4}$, $\overline{7}$ and $\overline{8}$ are provided to insure proper error decoding to distinguish over lapping syndrome subsets. Inasmuch as the one bits in the matrix of FIG. 2 determine the circuits for implementing check bit generation and error detection, location and correction, the less 1's there are in the matrix, the less circuitry is required to construct the system.

The speed of operation of check bit generator 2 and error detector 7 is determined by the longest path travelled by the input signals. Therefore, in addition to maximizing the number of 0 rows in the matrix module and minimizing the total number of 1's in the matrix, it is necessary to equalize the number of 1's in each row of the matrix.

Additional criteria used in designing the matrix includes rules inherent in single error correction/double error detecting codes. That is, each group must contain at least one check bit, each information bit must be a member of at least one code group and each code group must contain unique sets of information bits and check bits. In the case of SEC/DED, code optimization requires that each information and check bit belong to an odd number of code groups S1–S8. In the case of check bits, it is necessary that this number be 1 and in the case of information bits it is necessary that this number be greater than 1. The manner of choosing how many code groups a particular information bit will belong to is also essential. Except for architectural consideration, of the type to be illustrated below, membership in code groups is chosen in accordance with a method of generating gap length vectors (these gap lengths are the number of 0's existing between the 1's in the vector). The method consists of generating the gap length vector having the longest gap therein first. This can be accomplished by selecting the vector having the smallest Hamming weight or number of 1's in the vector first. From the full length equivalence class, that is, the predetermined vectors having full length, the gap length vectors can be generated which are used for the columns in the matrix. Once all the full length vectors have been utilized for that smallest weight the equivalence class for the next higher weight is utilized to generate the vectors utilized as the further columns in the matrix. This procedure continues until all the columns in the matrix are filled. The gap length notation from the equivalence class can be shifted to place the smaller gaps first in order to obtain the maximum number of zero rows in the matrix when all the vectors or columns are generated.

In this invention we are concerned with the provision of a modular structure of the encoding and decoding functions, the mechanization of which is based on a particular parity check matrix. The parity check matrix is partitioned into several sections, each section being a cyclic permutation of the other. That is, the sections are identical except for the shifting of the rows of succeeding sections by one row with respect to the other. For example, the first row of the first section becomes the second row of the second section and the third row of the third section, etc. Such an arrangement provides for modular implementation of the code, that is, the same hardware can be used for each section of the parity check matrix by simply altering the pin input/output connections. The code used in this invention has the following parity matrix H:

$$H = [T \mid T_1 \mid T_2 \mid \ldots \mid T_{r-1} \mid I_r]$$

where $r$ = the number of check bits $I_r = r \times r$ identity matrix $T = r \times b$ generating submatrix (=module)

$b$ = module size; $r \times b$ = information length $T_i$ = cyclic $i^{th}$ shift of $T$ by $i$ rows $T$ and $T_i$ relation can be given more precisely as:

$$T = \begin{bmatrix} v1 \\ v2 \\ \cdot \\ \cdot \\ \cdot \\ \cdot \\ \cdot \\ vr \end{bmatrix} \qquad T_i = \begin{bmatrix} v(r-i+1) \\ v(r-i+2) \\ \cdot \\ \cdot \\ v1 \\ v2 \\ \cdot \\ \cdot \\ v(r-i) \end{bmatrix}$$

where $v$'s are length $b$ row vectors of 1's and 0's.

T is defined as the generating submatrix and the construction of T amounts to the construction of the whole H matrix considering that each section defined by T is the same except for the cyclic permutation with respect to rows. It will be appreciated that the number of 1's in a T section is equal to the number of 1's in each row of the H matrix. The number of 1's in each row of the H matrix determines the number of levels the parity tree must have in mechanization. Thus, the first condition on the matrix or a section T is that it has the minimum overall number of 1's. The other criteria that must be taken into consideration in designing the H matrix is that all cyclic shifts of the columns of the T section appear in H. Hence, any column vector of T must be distinct from all r cyclic shifts of itself as the first condition. A vector is considered to be full length if and only if the vector is distinct from all its cyclic shifts, for example, 1000 is full length whereas 1010 is not. 1000 → 0100 → 0010 → 0001 → 1000 but 1010 → 0101 → 1010 has only two shifts. If vector V1 is a cyclic shift of V2, then V2 is also a cyclic shift of V1. The cyclic shift relationship also satisfies reflective and transitive requirements of an equivalence relation. The matrix H of equation (2.1) is a parity check matrix for SEC (single error correction) if and only if all the columns of the section T belong to a distinct full length cyclic equivalence class. Generally the parity check matrix of a single error correcting code can be constructed by simply listing a distinct $r$-digit column where $n$ is the code length and $r$ is the number of check bits. However, the columns or the parity check matrix itself is generated in this invention by generating the columns in accordance with a gap length notation of a vector. The gap length notation of a vector of length $r$ and Hamming weight $w$ is a $w$-tuple $(a_1, a_2, \ldots a_w)$ such that $a_i$ denotes the $i^{th}$ gap length between 1's in the vector in a cyclic order. For example, the vector $$(\overset{a_1}{\widehat{11}}\overset{a_2}{\widehat{010}}\overset{a_3}{\widehat{100}})$$

has a weight $w = 3$, a length $r = 6$ and the gap length $a_1 = 0$, $a_2 = 1$, and $a_3 = 2$. These gap lengths are the number of 0's that exist between the 1's in the vector. For example, $a_1$ would be the number of 0's existing between the two first 1's of the vector which is 0. The second gap length would be the number of 0's existing between the second two 1's in the vector, namely, the 1's in the second and fourth positions. It will be appreciated, that one 0 exists between these two 1's thus giving the gap length $a_2 = 1$. Similarly, the gap length or number of 0's between the third 1 and the first 1 going around the end of the vector gives $a_3 = 2$ since there are two 0's. Stating it mathematically:

$$\sum_{i=1}^{W} a_i = r - w$$

This gap length notation of the vector completely characterizes the vector up to its $r$ cyclic shifts. Accordingly, all the columns of T belong to a distinct full length cyclic equivalence class if and only if the gap length vectors also belong to a distinct full length equivalence class.

The gap length vector notation can be utilized to generate vectors of the H matrix which lie within a full length equivalence class by the following procedure or method.

First, a gap or length vector is generated by taking or selecting the vector having the longest gap therein. For example, taking the same example as used in defining the gap length vector, that is, $(r, w) = (6,3)$, $a_1 + a_2 + a_3 = 6 - 3 = 3$, it can be determined that 300 is the highest number of the full length cyclic equivalence class which can be used. Translating this into a column vector for the H matrix would result in a column (100011) having three 0's between the first and second 1 in the vector with the 1's in the fifth and sixth positions indicating no 0's between the 1's. The next vector or column to be selected for the H matrix would be selected from the equivalence class determined by 300 or would be the next smaller numbers in order which would be 210, 201, 120, 111, 102, 030, 021, 012, and 003.

Each time a gap length vector is generated, it is accepted as a column for the H matrix if (1) it is full length and (2) all its cyclic shifts are distinct from all previously accepted vectors. The order of acceptance does not matter due to the equivalence relationship. For example, using the same example as noted above, $(r,w) = (6,3)$ using the longest gap length vector first, namely 300, it can be seen that 111 is not full length since the vector would be 101010 which when shifted would be 010101 and when shifted again would be 101010 which is only three shifts, not six as required. Thus, it is considered to be a non-full length vector and hence is rejected. Table 1 below shows all the possible full length cyclic equivalence classes for some $(r,w)$'s.

TABLE 1

| | | |
|---|---|---|
| (7,2) | (7,3) | |
| 50 | 400 | |
| 41 | 310 | |
| 32 | 301 | |
| | 220 | |
| | 211 | |
| (8,2) | (8,3) | (8,4) |
| 60 | 500 | 4000 |
| 51 | 410 | 3100 |
| 42 | 401 | 3010 |
| | 320 | 3001 |
| | 311 | 2200 |
| | 302 | 2110 |
| | 221 | 2101 |
| | | 2011 |
| (9,2) | (9,3) | (9,4) |
| 70 | 600 | 5000 |
| 61 | 510 | 4100 |
| 52 | 501 | 4010 |
| 43 | 420 | 4001 |
| | 411 | 3200 |
| | 402 | 3110 |
| | 330 | 3101 |
| | 321 | 3020 |
| | 312 | 3011 |
| | | 3002 |
| | | 2210 |
| | | 2201 |
| | | 2120 |
| | | 2111 |
| (10,2) | (10,3) | (10,4) |
| 80 | 700 | 6000 |
| 71 | 610 | 5100 |
| 62 | 601 | 5010 |
| 53 | 520 | 5001 |
| | 511 | 4200 |
| | 502 | 4110 |
| | 430 | 4020 |
| | 421 | 4011 |
| | 412 | 4002 |
| | 403 | 3300 |
| | 331 | 3210 |
| | 322 | 3201 |
| | | 3120 |
| | | 3111 |
| | | 3102 |
| | | 3030 |
| | | 3021 |
| | | 2220 |
| | | 2211 |
| | | 2121 |

Using the simple example, SEC (single error correction) code where the T of the matrix can be constructed from vectors from $(r,2)$ where $r$ is the length of the vector and 2 is the Hamming weight or number of 1's in the vector. The smallest weight $w$ vector is selected first and then the weights are successively increased until all the $b$ columns of the section of the matrix are filled. It will be noted from the example (Table 2) matrix below that the first row of the T is an all 1 row for an automatic byte parity of the section of the matrix. This entails an EXCLUSIVE OR operation on all the bits of the byte. For SEC/DED, where optimum mechanization is desirable, odd $w$ vectors can be used; $w = $ 3, 5, 7, etc., or use any vectors of $(r-$ 1, $w)$ and use the last row in the matrix for making each column odd weight which gives $(r-b) \cdot b$ information length. It should be noted that each column vector in the T section of the matrix can be preshifted as desired. For our purpose, the shifting is done so that the greatest gap length is the last one. For example, using a matrix T, shown in Table 2, the columns of the matrix are identified by A–H.

TABLE 2

$b$=8, $r$=8, SEC only

| A | B | C | D | E | F | G | H | | |
|---|---|---|---|---|---|---|---|---|---|
| 1 | 1 | 1 | 1 | 1 | 1 | 1 | 1 | A | 06 |
| 1 | 0 | 0 | 1 | 0 | 1 | 1 | 0 | B | 15 |
| 0 | 1 | 0 | 1 | 1 | 0 | 0 | 1 | C | 24 |
| 0 | 0 | 1 | 0 | 1 | 1 | 0 | 0 | D | 005 |
| 0 | 0 | 0 | 0 | 0 | 0 | 1 | 1 | E | 104 |
| 0 | 0 | 0 | 0 | 0 | 0 | 0 | 0 | F | 014 |
| 0 | 0 | 0 | 0 | 0 | 0 | 0 | 0 | G | 023 |
| 0 | 0 | 0 | 0 | 0 | 0 | 0 | 0 | H | 113 |

The last gap is the greatest gap

The columns of the matrix are generated in accordance with the gap length notation wherein the $(r,w)$ is (8,2); where 2 is the smallest weight. Thus, we have an 8 bit vector having two 1's. Referring to the table for an (8,2) full length cyclic equivalence class we find 60,51 and 42. These are utilized to generate the A, B and C columns as indicated. It should be noted that the columns and gap lengths are pre-shifted. That is, instead of using 60, 51 and 42, we are using 06, 14 and 24. This is important since this arrangement provides the maximum number of 0 rows. This minimizes the number of input/output connections when mechanizing the arrangement. In order to generate the further columns of the matrix, the next equivalence class (8,3) is utilized and is also shifted to get the maximum number of 0's columns.

TABLE 3

$b$=8, $r$=8, SEC-DED

| A | B | C | D | E | F | G | H | | |
|---|---|---|---|---|---|---|---|---|---|
| 1 | 1 | 1 | 1 | 1 | 1 | 1 | 1 | A | 005 |
| 1 | 0 | 1 | 0 | 0 | 1 | 0 | 1 | B | 104 |
| 1 | 1 | 0 | 0 | 1 | 0 | 0 | 1 | C | 014 |
| 0 | 1 | 1 | 1 | 0 | 0 | 1 | 1 | D | 203 |
| 0 | 0 | 0 | 1 | 1 | 1 | 0 | 1 | E | 113 |
| 0 | 0 | 0 | 0 | 0 | 0 | 1 | 0 | F | 023 |
| 0 | 0 | 0 | 0 | 0 | 0 | 0 | 0 | G | 212 |
| 0 | 0. | 0 | 0 | 0 | 0 | 0 | 0 | H | 00003 |

In dealing with the single error correction and double error detecting code as shown in Table 3, the first equivalence class selected should be odd weight to keep the code within the odd weight criteria as set forth in the prior art. Thus, (8,3) is selected from the Table 1. Again, the columns and gap length notation are preshifted to get the maximum number of 0 rows in the matrix. The (8,3) gap length notations from the Table are used for generating A-G. However, H is obtained by going to the next odd weight $w$ which would be 5 thus giving (8,5). However, it should be noted from Table 1 that if $w$ is greater than $r/2$ $(r,r-w)$ should be used and complemented. Since $w = 5$ and is greater than 1/2r, we use $(r,r-w) =$ (8,3) and complement. One entry under (8,3) from the Table has a gap length vector designated by 500 or:

1
0
0
0
0
0
1
1

Complementing this vector changes all the 1's to 0 and the 0's to 1's to get:

0
1
1
1
1
1
0
0

This can be shifted upward to start the column by 1 to get:

1
1
1
1
1
0
0
0 which can be easily seen to be: 00003, the gap length notation for column H in the matrix.

Figure 3:
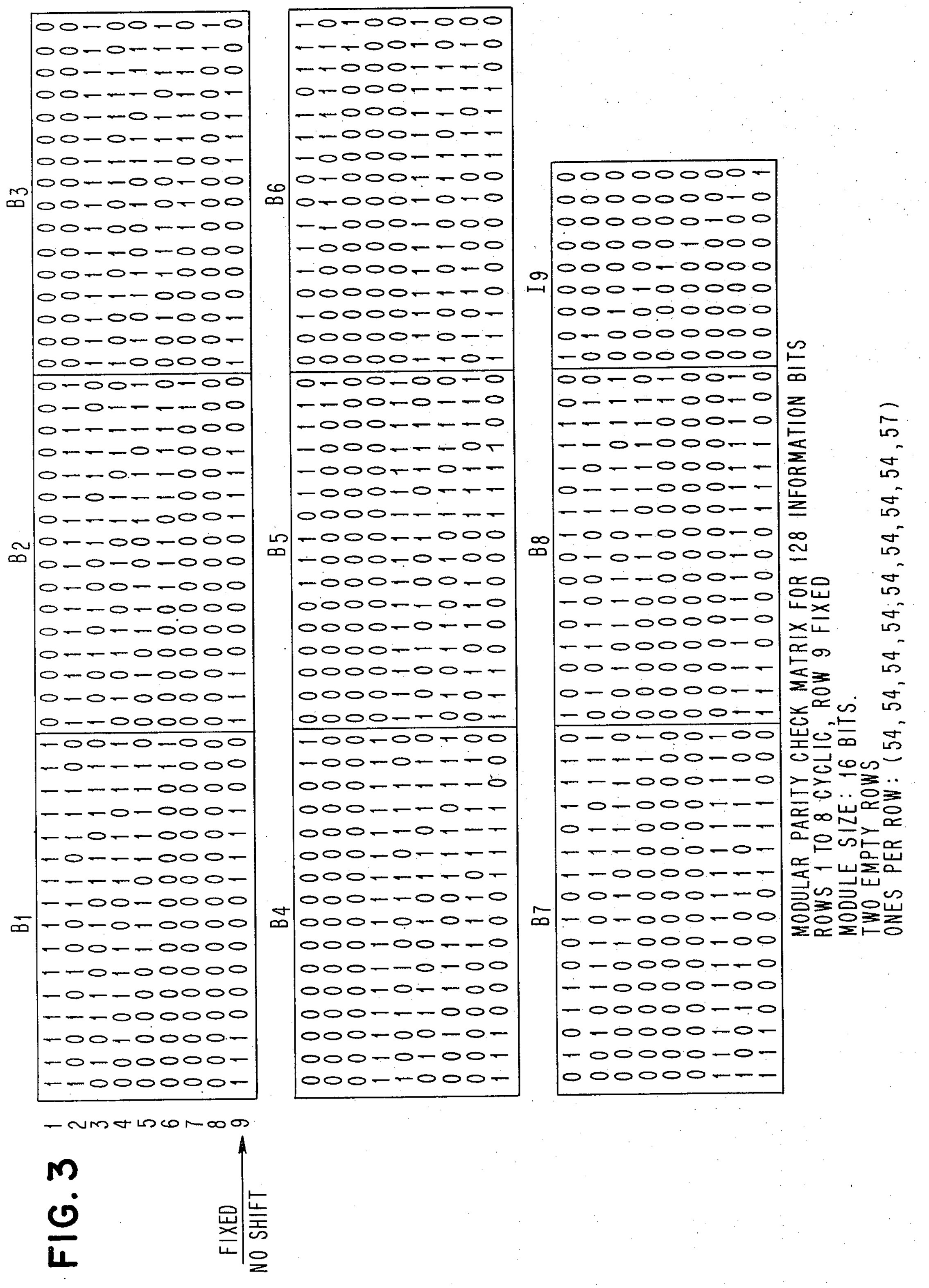
FIG. 3 is a modular parity check matrix for 128 information bits with rows 1–8 cyclic, and row 9 fixed.

The H matrix with $r$ check bits and a $b$-bit byte or module size may not use the full shift of the T matrix if the information length is less than $r - b$. This will result in a different number of 1's in each row of the H matrix. For example, the code can be modular without all the rows of the module being cyclic. For instance, a 9 check bit SEC code can be made for 128 data bits by having the first eight rows of T cyclic and the last row the same in each module. The same case, single error correction/double error detection can be done by (8,$w$) where $w$=2, 3, 4, etc. design and the last row can be stationary in each byte to make each column odd parity. This row is designated as 9 in FIG. 3 and is fixed in each byte B1–B8. It should also be noted that rows 1-8 are cyclically permutated. That is, each row is shifted by 1 row in each byte so that the all 1 row or first row in B1 becomes the second row in B2, etc.

It will be appreciated that the criteria for optimized encoding and decoding is similar to the prior art and is obtained by choosing the smaller w vectors first, thus insuring the minimum number of 1's in each row of the H matrix, and by arranging all 1's in one row of T an automatic byte or module parity is achieved. In addition, the number of all 0 rows is maximized by choosing the larger gap vectors first thus minimizing the necessary input/output pins for each module. Applying the code design method given in the previous section, provides an implementation which is completely modular, that is, one part number only is involved. There is a minimum delay in check or syndrome generation because of the minimum number of 1's involved in the matrix. There is a minimum number of input/output pins per module because of the gap length notation vector selection of the matrix.

Figure 2:
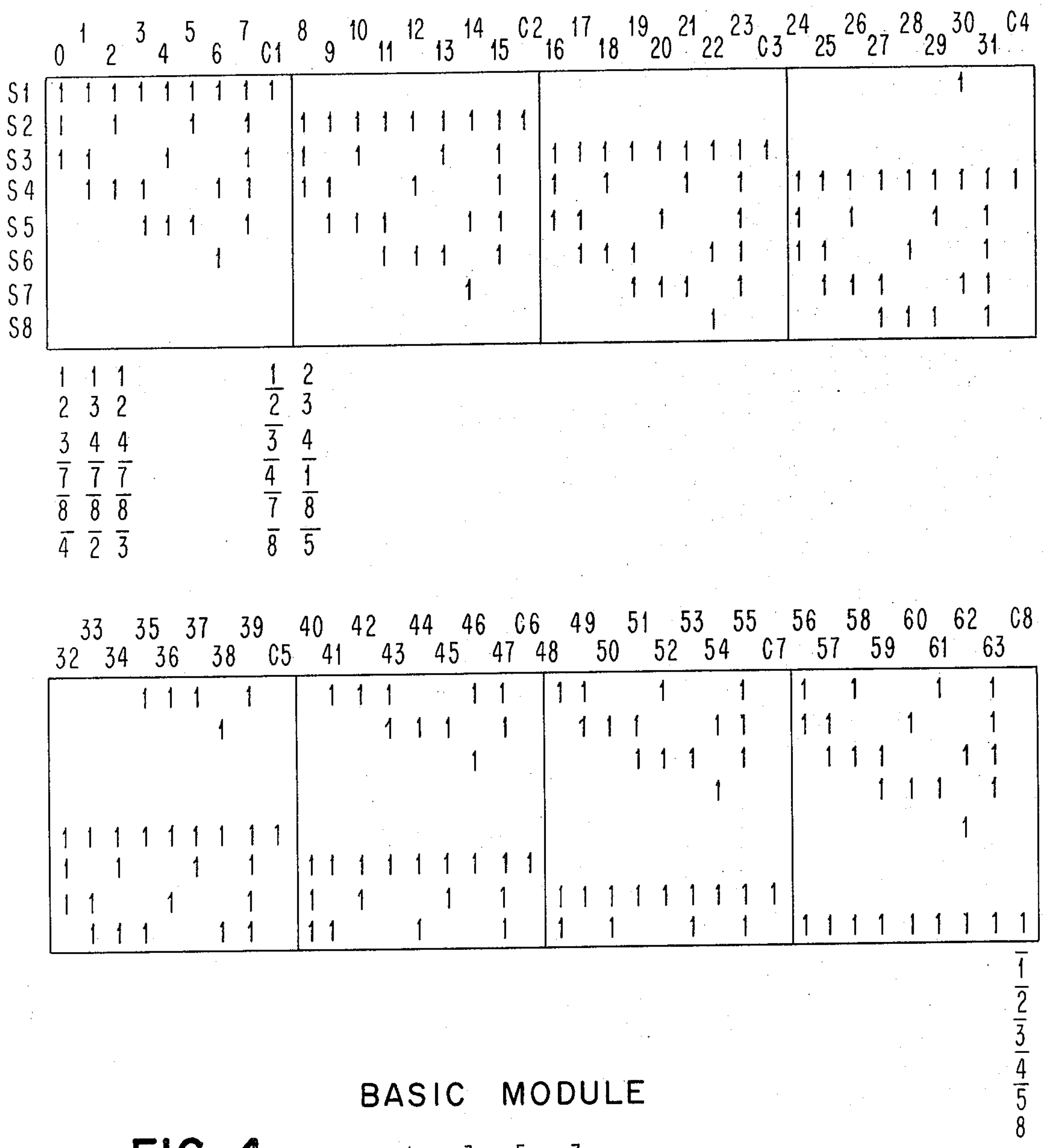
FIG. 2 is a diagram of a matrix illustrating the interconnections provided within the check bit generator, error detector and error locator of FIG. 1.

While FIG. 2 illustrates a (72,64) code, the same method may be applied to design other matrices for this code as well as other code structures which may be mechanized in a similar manner. As previously mentioned, a byte and a check bit is used as the basic module in designing the code. The inclusion of a check bit i associated with byte $i$ improves the speed of decoding and makes the complete modularity of the system possible.

DETAILED DESCRIPTION

Figure 4:
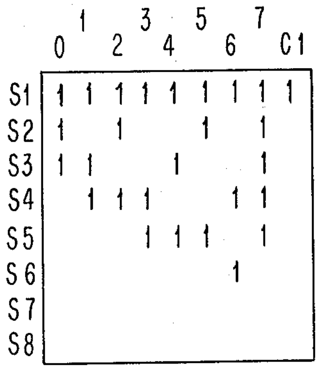
FIG. 4 is a partial matrix showing the basic module section from which the H matrix is constructed.

Referring to FIG. 4, the basic module of a (72,64) SEC/DED (single error correction/double error detection) code matrix is shown in FIG. 4. The check bit C1 is shown at the end of the row S1. This code or module corresponds to the SEC/DED code having length $b$ = 8 and $r$ = 8 designed in Table 3, previously. Comparing FIG. 4 with the H matrix shown in FIG. 2, it can be seen that the entire code of FIG. 2 is composed by all possible cyclic shifts of the rows of the basic module matrix of FIG. 4. Each byte of the matrix of FIG. 2 contributes to six check (or syndrome) bits which implies the savings in input/output pins. Based on the structure of the basic module shown in FIG. 4, a hardware module, such as shown in FIG. 5, can be designed and used as a repeated unit for the entire mechanization of the code by proper interconnections as will be shown in connection with FIG. 6.

Figure 5:
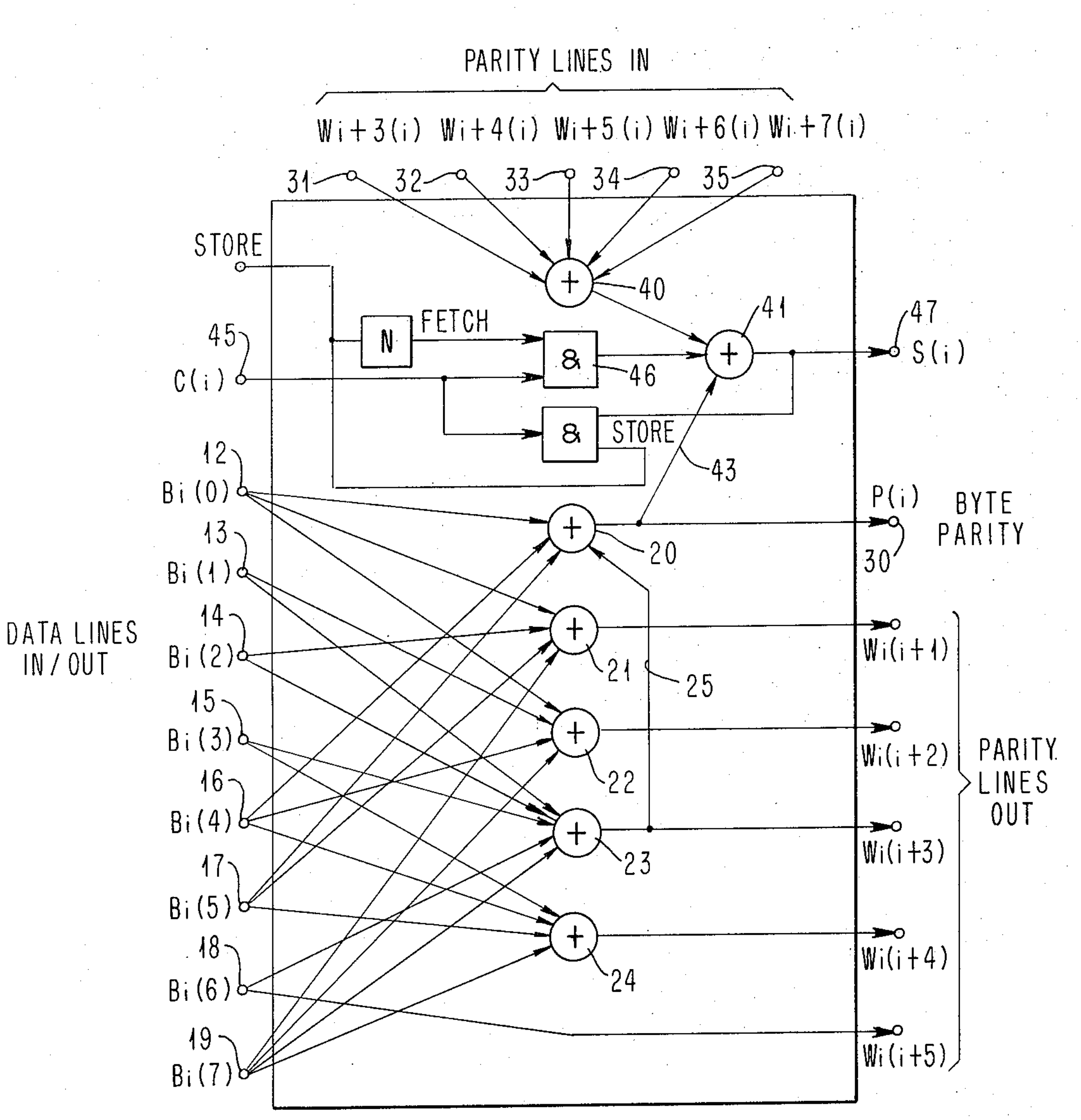
FIG. 5 is a schematic circuit diagram showing the circuit connections on the basic module.

Referring now to FIG. 5, the check bit generator 2 and the error detector 7 will be described. The two functions may be served by the same device with slight modifications. Accordingly, FIG. 5 represents both the check bit generator 2 and the error detector 7, the B input legends and C output legends operating in the one circuit and the B and C input legends and S output legends operating in the other. The overall purpose of the check bit generator is to monitor the incoming information bits B0–B63 to generate check bits C1–C8. This is accomplished on a byte basis by receiving each of the bits in parallel with each byte input being applied to its respective module. The information arrives on the bus line 1 in parallel. The first byte being applied to the first module unit, the second byte being applied to the second module, etc. Thus, it can be seen that each byte is supplied to its respective module in parallel. The parallel bits represented as the Bi(0), Bi(1), Bi(2) . . . Bi(7) are inputted to respective terminals 12–19 on the $i^{th}$ basic module. These information bit inputs are connected to an EXCLUSIVE OR circuit grouping designated as EXCLUSIVE OR circuits 20–24. The connections between the input terminals of the module and the EXCLUSIVE OR circuits 20–24 are made in accordance with the 1's in the basic module matrix shown in FIG. 4.

Referring to the basic module of FIG. 4, it can be seen that the Bi(0) bit of the byte has a 1 in row S1, S2, S3. Accordingly, the Bi(0) input to the corresponding module is connected to the EXCLUSIVE OR circuits 20, 21, and 22. Similarly, bit Bi(1) is connected in accordance with the 1's in row S1, S3 and S4. Thus, Bi(1) is shown as having a connection to EXCLUSIVE OR circuit 22 and 23 with the connection to EXCLUSIVE OR circuit 20 being taken care of by the feedback 25 from EXCLUSIVE OR circuit 23 to EXCLUSIVE OR circuit 20. Thus, each bit of the byte is connected to the code groups as designated by the 1's in the basic module. It must be kept in mind that each row of the basic module represents a partition or a section of the code group. Another way of looking at the code grouping of EXCLUSIVE OR circuits 20–24 is that each EXCLUSIVE OR circuit 20–24 is representative of a row in the matrix and has the bit inputs applied thereto which contribute to the row, that is, which have a 1 in that bit place in the row in the matrix. For example, EXCLUSIVE OR circuit 20 has a 1 bit input from each input bit in the byte corresponding to a 1 input in each place in the row S1. Accordingly, inputs Bi(0), Bi(4) and Bi(5) are shown connected to EXCLUSIVE OR circuit 23 which EXCLUSIVE OR output is connected by feedback connection 25 to EXCLUSIVE OR circuit 20 having the same effect as if they had all been connected to EXCLUSIVE OR circuit 20. The output from EXCLUSIVE OR circuit 20 is the EXCLUSIVE OR of all the bits in that row giving the parity of the $i^{th}$ module Pi connected to output terminal 30. Similarly, EXCLUSIVE OR circuit 21 represents row S2 of the basic module and thus should have an input from the bits 0, 2, 5 and 7 which are the 1's in row S2. From FIG. 5, it can be seen that EXCLUSIVE OR circuit 21 has inputs from Bi(0), Bi(2), Bi(5) and Bi(7). The output from EXCLUSIVE OR circuit 21 is the parity of that section of the code group and is designated $wi\ (i+1)$. Thus, the output of each EXCLUSIVE OR circuit 20-24 is the parity of the section of the code group associated with the respective module. In order to generate the check bit for a code group it is necessary to have as inputs to the module the parities of the sections of the same code group from the other modules. These inputs are shown connected to input terminals 31–35 and are designated as $wi+3(i)$, $wi+4(i)$, $wi+5(i)$, $wi+6(i)$ and $wi+7(i)$. These inputs are connected to an EXCLUSIVE OR circuit 40, the output of which is connected to a further EXCLUSIVE OR circuit 41. The other input to EXCLUSIVE OR 41 is the overall parity bit P(i) connected thereto from the output of EXCLUSIVE OR circuit 20 by connection 43. Thus, the inputs to EXCLUSIVE OR circuit 41 are the parities of the other sections of the code group plus the parity of the section of the same code group associated with the respective module. The output of EXCLUSIVE OR circuit 41 consists of the check bit C(i) which is available at output terminal 45. As was previously mentioned, the check bit generated is attached to the information byte and stored therewith. The same basic module can be used for the error detector 5, the only difference being that the basic module when used as an error detector receives the check bit information along with the byte to compute the syndrome S(i) at output 47. It can be seen from the basic module of FIG. 5, that the check bit C(i) is utilized as an input to terminal 45 when the module is operating as an error detector. This C(i) signal passes through AND circuit 46 and takes part in the EXCLUSIVE OR operation in EXCLUSIVE OR circuit 41 to produce the output syndrome S(i) at output 47.

Expressing the relationships for obtaining the check bits and the syndrome bits, the following notations are used:

$$P(i) = W_i(i) = B_i(0) \oplus B_i(1) \oplus B_i(2) \oplus B_i(3) \oplus \ldots \oplus B_i(7) \quad (1)$$

$$W_i(i+1) = B_i(0) \oplus B_i(2) \oplus B_i(5) \oplus B_i(7) \quad (2)$$

$$W_i(i+2) = B_i(0) \oplus B_i(1) \oplus B_i(4) \oplus B_i(7) \quad (3)$$

$$W_i(i+3) = B_i(1) \oplus B_i(2) \oplus B_i(3) \oplus B_i(6) \oplus B_i(7) \quad (4)$$

$$W_i(i+4) = B_i(3) \oplus B_i(4) \oplus B_i(5) \oplus B_i(7) \quad (5)$$

$$W_i(i+5) = B_i(6) \quad (6)$$

$$C(i) = W_i(i) \oplus W_{i+3}(i) \oplus W_{i+4}(i) \oplus W_{i+5}(i) \oplus W_{i+6}(i) \oplus W_{i+7}(i) \quad (7)$$

$$S(i) = C(i) \oplus C'(i) \text{ where } C'(i) \text{ is the stored check bit} \quad (8)$$

Equation (1) equates the parity of the $i^{th}$ module to all of the input bits of the byte $B_i(0)$–$B_i(7)$ EXCLUSIVE OR'ed together. Equation (2) is the partial parity of the next row in the matrix following the $i^{th}$ row. Similarly, $W_i(i+2)$ through $W_i(i+5)$ are obtained the same way. Equation (7) indicates that the check bit for the $i^{th}$ module is obtained by EXCLUSIVE ORing the rows in the various sections which are in the same code group. For example, $i=1$, the equation represents that the first row of the first module participates as well as the first row of the $i+3$ module which is the fourth module where a 1 is in the information bit 30. The fifth, sixth, seventh and eighth modules all have a first row participation. The equation (8) indicates that the syndrom consists of EXCLUSIVE ORing the generated check bit $C(i)$ with the stored check bit or previously generated check bit $C'(i)$. The syndrome bits S1–S8 indicate whether odd or even parity for the corresponding code group has occurred.

In summary, the module corresponding to each byte of the data is the same; $i$ representing the $i^{th}$ byte and the $i^{th}$ module. The internal connections on the module are determined by equations (1) – (8). The $i^{th}$ module performs the following functions:

1. Accepts $i^{th}$ byte as input for the check bit computation, or accepts the $i^{th}$ byte and the $i^{th}$ check bit as input for syndrome computations.
2. Computes the partial parity contribution $W_i(j)$ from byte $i$ for the $j^{th}$ check or syndrome bit. $J$ has the values $i, i+1, i+2, i+3, i+4, i+5$ and $i+6$ modulo 8 (see equations 1–6).
3. Accepts the partial parity contributions computed by the other modules; namely, $W_{i+3}(i)$, $W_{i+4}(i)$, $W_{i+5}(i)$, $W_{i+6}(i)$, $W_{i+7}(i)$ from modules $i+3, i+4, i+5, i+6$, and $i+7$, respectively (all numbers are modulo 8).
4. Computes the check bit $C(i)$ or syndrome bit S(i) using the partial parity contributions according to equations (7) and (8). The module also provides a store line in conjunction with AND gates for store or fetch operation for check bit or syndrome bit computations, respectively.

Figure 6:
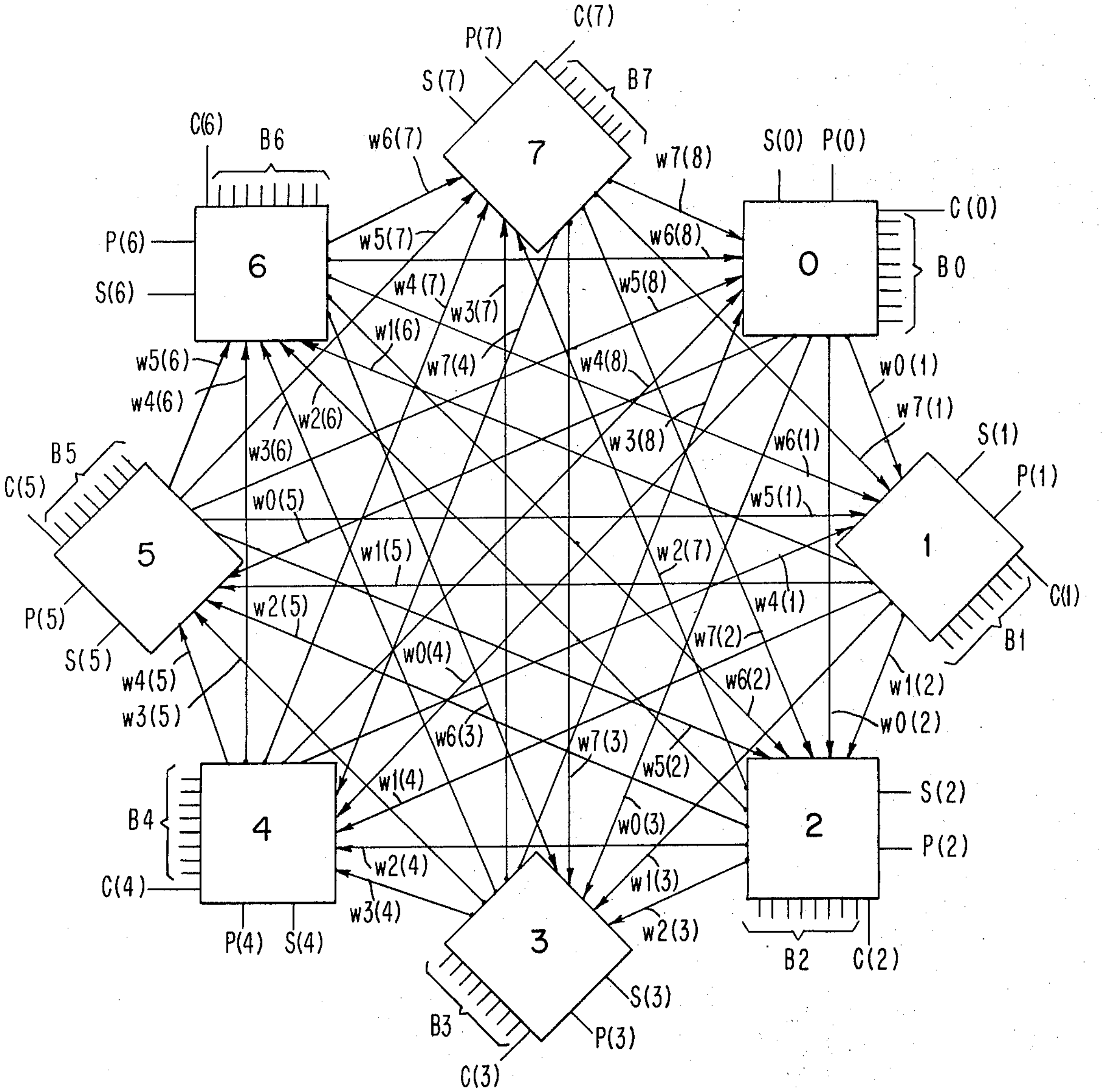
FIG. 6 is a schematic diagram showing the interconnections between the modules.

The module interconnections are determined by equation (7) and are shown in FIG. 6. There are 8 identical modules connected in a symmetrical manner for processing the 8 byte word. The modules are numbered from 0–7 corresponding to the byte numbers 0–7. Each module 0–7 is connected to the other modules for receiving the partial parity contributions for the parts of the code group from the other bytes. For example, the module 2 receives as inputs W5(2), W6(2), W7(2), W0(2), and W1(2) from modules 5, 6, 7, 0 and 1, respectively. Similarly, module 2 has its partial parity outputs connected to modules 3, 4, 5, 6 and 7 for conveying the partial parity contributions W2(3), W2(4), W2(5), W2(6) and W2(7), respectively. Each module receives the corresponding byte as an input designated by B0–B7 shown as an 8-bit input to each of the modules 0–7 and provides a corresponding byte parity, check or syndrome bit and partial parities as outputs. The store status line is connected to each module to control the check bits versus syndrome bits computations.

Figure 7:
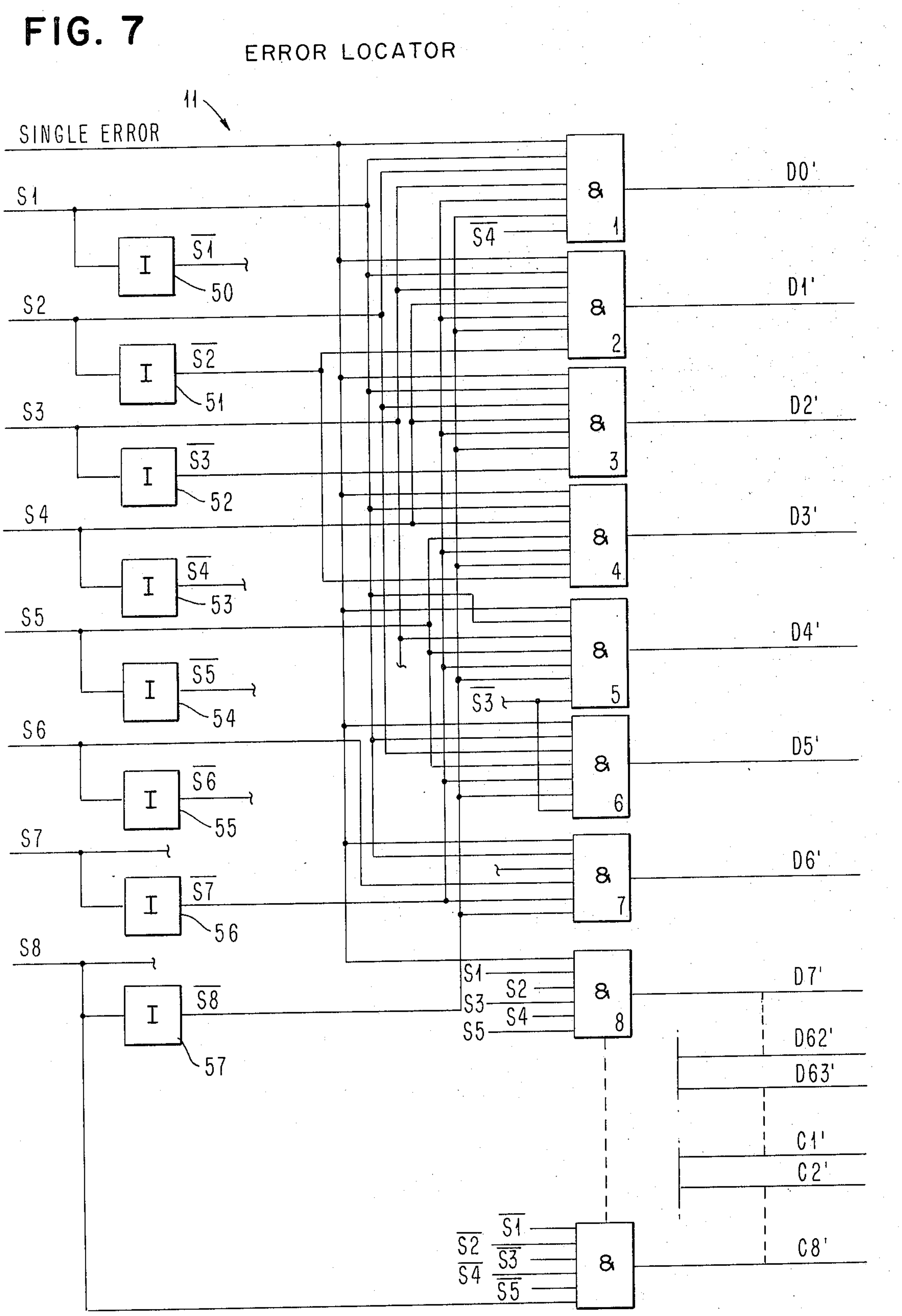
FIG. 7 is a schematic diagram of the error locator shown in FIG. 1.

Referring to FIG. 7, the error locator 11 will be described. The error locator monitors the syndrome signals S1–S8 which indicate, by a 1 bit, if the corresponding code group has odd parity. The error locator 11 places a signal on a "bit incorrect line" D0′–B63′ and C1′–C8′ to indicate that the information or check bit corresponding to that line is incorrect and must be corrected. The error locator 11 comprises 72 AND circuits A1–A72 corresponding to the 72 columns of the matrix in FIG. 2. For example, AND circuit A1 receives inputs from lines S1, S2, and S3 and the single error line to place a signal on the D0′ line. Additional inputs are provided on lines $\overline{S4}$, $\overline{S7}$ and $\overline{S8}$. The additional inputs are provided on lines $\overline{S4}$, $\overline{S7}$ and $\overline{S8}$ to prevent erroneous operation in the absence of a signal. Inverse signals $\overline{S1}$ – $\overline{S8}$ are provided by inverters 50–57. It is not necessary to provide multi input AND circuits of the type shown, two input AND circuits being usable. For example, additional levels of AND/OR circuits can be provided.

In summary, 64 information bits D0–D63 are received on bus 1 and connected in parallel byte form to respective modules where the corresponding check bits C1–C8 are generated by the check bit generator 2 and placed on bus 3. The check bits are added to the information bits and placed in storage or utilized as a 72 bit code word. Upon reading from storage via bus 6, the error detector 7 monitors the 72 bits of the message and places on the bus 8 the S1–S8 syndrome signals indicating the code groups affected by any error. The error locator 11 generates, as a function of the syndrome signals and single error signal, a signal on the 72 bit bus 12 indicating the location of the error and the error corrector 13 then inverts the erroneous bit to place a corrected code word on buses 14 and 15.

In detail, suppose that the bit D0 is in error when read from the storage on bus line 6. The code word is received at the error detector 7 via bus 6, the changed condition of information bit D0 being detected by EXCLUSIVE OR circuits 1, 2 and 3 on module 1. It can be seen that these EXCLUSIVE OR circuits will result in the byte parity P(i) being in error as well as $W_i(i+1)$ and $W_i(i+2)$ where $i$ is equal to 1. Since P(i) is also involved in generating C(i) and S(i), these two will also be in error. Since the partial parities $W_i(i+1)$, $W_i(i+2)$ are is error, they introduce an error in the computation on the next two succeeding modules to which they are connected. Thus, S(2) and S(3) will be in error. It can be seen from the H matrix in FIG. 2 that if the bit D0 is in error, S(1), S(2) and S(3) will be affected since the bit contributes to these three code groups. In FIG. 1, OR circuit 9 detects an error and EXCLUSIVE OR circuit 10 recognizes the odd number of syndrome signals on bus 8 as a single error. In FIG. 7, the error locator 11 receives inputs on lines S(1), S(2), S(3) and the single error line causing AND circuit A1 to supply a signal on line D0′. The error corrector 13 may comprise 72-two input EXCLUSIVE OR circuits, each receiving one input from bus 6 and a corresponding input from bus 12. The error corrector inverts position D0 but otherwise passes the code word on bus 6 to buses 14 and 15.

The code utilized as an example in this invention is an SEC/DED code which in the prior art has been mechanized using combinational logic arrangements rather than the more economical sequential arrangement utilized in this invention. The construction process of the code is best described in terms of the parity check matrix. The matrix is constructed in such a way that modular implementation of the code is possible by providing identical units which can be distributed throughout the system such as a memory. The arrangement provides a minimum delay for decoding and encoding and includes an automatic module parity provision. The matrix itself is designed such that a minimum input/output pin arrangement per module results.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. In a system for detecting and correcting errors in code words having a plurality of information bits and a plurality of check bits, each information bit assigned to a number of code groups, the plurality of code groups being divided into equal length sections, each section forming an information byte of equal number of information bits, an improved check bit generator comprising:

input means for accepting signals manifesting information bits;

a plurality of identical modular units corresponding in number to the number of said equal length sections;

a number of identical logic circuit groupings, one for each byte, one located on each of said plurality of identical modular units;

connecting means for connecting each identical logic grouping to the input means to accept those information bit signals that are assigned to the respective section of the code groups, each identical logic grouping supplying at outputs a parity signal for each length of each code group within the section;

a second logic circuit means, one located on each of said modules, connected to input means to receive the parity signals from other modules generated in accordance with the lengths of the same code group and generate a parity output representative of said inputs; and third logic circuit means, one located on each of said modules, for combining the parity signal from said second logic circuit means and the parity signal for the length of the same code group generated by the respective module to supply at an output of the respective module one check bit signal manifesting a function of the information bit signals in its code group.

2. In a system for detecting and correcting errors according to claim 1, wherein said identical logic circuit groupings include a plurality of EXCLUSIVE OR circuits, one for each partial code group in the section to which at least one information bit is assigned.

3. In a system for detecting and correcting errors according to claim 2, wherein said connecting means connecting said logic grouping to said input means includes a connection from the input terminal at which a particular information bit is received to each of said EXCLUSIVE OR circuits representing a partial code group to which said information bit is assigned.

4. In a system for detecting and correcting errors according to claim 3, wherein said EXCLUSIVE OR circuits in said logic grouping each provide at an output the parity of the partial code group associated with the respective EXCLUSIVE OR circuit.

5. In a system for detecting and correcting errors according to claim 1, wherein said logic grouping performs the EXCLUSIVE OR operation on each information bit input of said byte thereby providing a parity signal at an output of said logic grouping representing the parity of all the information bits utilized in said module.

6. In a system for detecting and correcting errors in accordance with claim 1, wherein said second logic circuit is an EXCLUSIVE OR circuit providing as an output the modulo 2 addition of the parity inputs thereto of the partial code groups of the same code group from the other modules of the system.

7. In a system for detecting and correcting errors in accordance with claim 6, wherein said third logic circuit is an EXCLUSIVE OR circuit for performing the EXCLUSIVE OR function on said output of said second logic circuit and the parity of the byte or partial code group associated with the module to produce as an output therefrom the check bit of the entire code group.

8. In a system for detecting and correcting errors in code words having a plurality of information bits and a plurality of check bits, each information bit assigned to a number of code groups, the plurality of code groups being divided into equal length sections, each section forming an information byte of equal number of information bits, an improved error detector comprising:

input means for accepting signals manifesting information bits;

a plurality of identical modular units corresponding in number to the number of said equal length sections;

a number of identical logic circuit groupings, one for each byte, one located on each of said plurality of identical modular units;

connecting means for connecting each identical logic grouping to the input means to accept those information bit signals that are assigned to the respective section of the code groups, each identical logic grouping supplying at outputs a parity signal for each length of each code group within the section;

a second logic circuit means, one located on each of said modules, connected to input means to receive the parity signals from other modules generated in accordance with the lengths of the same code group and generate a parity output representative of said inputs;

means located on said module to receive a previously stored check bit associated with said module;

third logic circuit means, one located on each of said modules, for combining the parity signal from said second logic circuit means with said received check bit and the parity signal for the length of the same code group generated by the respective module to supply at an output of the respective module a syndrome signal manifesting an error if the correct parity of the code group is not obtained or the received check bit is in error.

* * * * *